Oct. 17, 1961 L. E. ASKE 3,005,173
SLIP RING CONSTRUCTION
Filed July 1, 1957 2 Sheets-Sheet 1

INVENTOR.
LEONARD E. ASKE
BY
ATTORNEY

Oct. 17, 1961 L. E. ASKE 3,005,173
SLIP RING CONSTRUCTION
Filed July 1, 1957 2 Sheets-Sheet 2

INVENTOR.
LEONARD E. ASKE
BY
ATTORNEY

United States Patent Office 3,005,173
Patented Oct. 17, 1961

3,005,173
SLIP RING CONSTRUCTION
Leonard E. Aske, Minneapolis, Minn., assignor to Minneapolis-Honeywell Regulator Company, Minneapolis, Minn., a corporation of Delaware
Filed July 1, 1957, Ser. No. 669,347
2 Claims. (Cl. 339—8)

This invention relates to slip rings and relates more particularly to sets of slip rings having concentric tube construction.

The use of slip rings and sliding brush contacts to electrically connect two members having relative rotational motion is well known and has long been used in many types of rotating machinery. The slip rings are usually placed around a supporting shaft, electrically insulated from the shaft and from each other, and connected by wires to the unit with which the slip ring assembly rotates. The shaft is usually necessary to maintain the rigidity and strength of the slip ring assembly, but can be a disadvantage in that it limits the space in a given assembly available to wiring and insulating material. On the other hand, a slip ring made without a center shaft, for example by embedding the conducting wires and slip rings in plastic insulating material, is more likely to break or be damaged during manufacture and use due to the absence of the strong center shaft. And where the slip ring assembly must be self-supporting, that is, supported only at one end, the difficulties are even greater.

My invention, however, overcomes difficulties such as those mentioned above. A slip ring constructed according to my invention is rigid and strong, can be successfully hermetically sealed to the device supporting it, and has many engineering and economic advantages over the prior art.

Accordingly, it is an object of my invention to provide a slip ring construction having a concentric tube arrangement.

Another object of this invention is to provide a slip ring construction which is rigid and sturdy.

Still another object of this invention is to provide a slip ring construction that is economical to manufacture.

These and other objects of the present invention will be understood upon consideration of the accompanying specification, claims, and drawings, of which:

Figure 1:
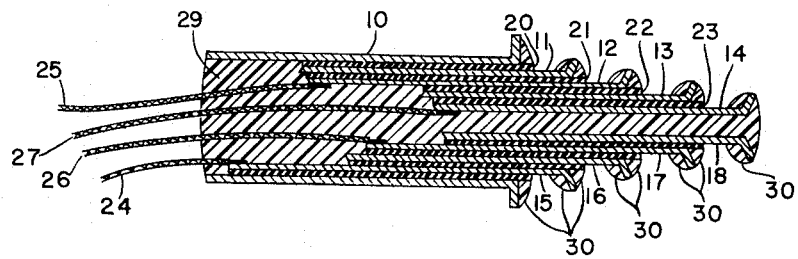
FIGURE 1 is a cross sectional diagram showing, in exaggerated proportions, a slip ring construction embodying the invention.

Referring now to FIGURE 1, there is shown a cross section view of a slip ring construction in which the thickness of the sections is somewhat exaggerated for clarity. There is shown a retainer tube 10, which has fitted concentrically inside it progressively smaller diameter tubes 11, 12, 13, and 14. Tubes 11, 12, 13 and 14 conduct current, in use, in an axial direction. The tubes 11, 12, 13, and 14 have bare metallic surfaces at one end; these surfaces are designated as slip rings 15, 16, 17, and 18. Insulating films 20, 21, 22, and 23 physically and electrically separate the tubes 10, 11, 12, 13, and 14 and may be, for example, coatings on the outer surfaces of the conducting tubes. Also shown are conductors 24, 25, 26, and 27 connected to the inside ends, opposite the slip rings, of tubes 11, 12, 13, and 14. The center portion 29 and the fillets 30 consist of plastic insulating or potting material.

Figure 2:
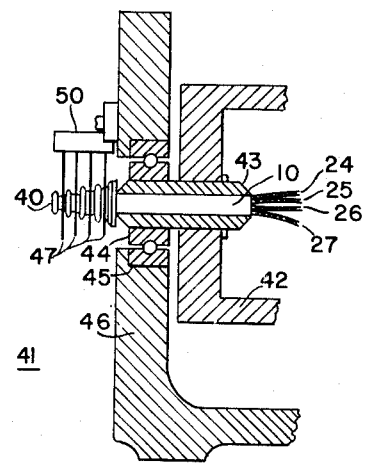
FIGURE 2 is a diagram of an assembly including a slip ring construction embodying the invention.

FIGURE 2 displays a slip ring construction 40 of the type described, as used in a structure 41, which has a rotating assembly 42. Retaining tube 10 of slip ring assembly 40 is positioned inside a sleeve 43, on the outer surface of which are attached rotating member 42 and an inner race 44 of a ball bearing. The outer race 45 of the ball bearing is positioned in a stationary member 46. Wire brushes 47, which are held by bracket 50, are shown to be riding against the slip rings of slip ring construction 40. Conductors 24, 25, 26, and 27 extend from the opposite end of slip ring construction 40.

Explanation of FIGURE 1

With reference now to FIGURE 1, it can be seen that the slip ring construction is made up of concentric tubes positioned axially so that the innermost tubes extend the farthest beyond the end of retainer tube 10. From outside to inside of the construction, then, each tube protrudes beyond the previous tube, and a surface of each tube is thereby exposed. These exposed surfaces are, of course, suitable for use as slip rings. While the slip ring ends of tubes 11, 12, 13, and 14, are shown to be flanged, this is not necessary, but may be desirable in some applications. The flanges in the embodiment shown in FIGURE 1 strengthen the insulating barriers or fillets 30 between adjacent slip rings. These barriers assure alignment of the wire contact brushes that rest against the slip rings. It will also be noted that the inner space of the slip ring construction is filled with plastic material 29; this plastic filling 29 acts to completely seal the slip ring construction.

In fabricating a slip ring construction, such as shown in FIGURE 1, the wire conductors 24, 25, 26, and 27 are soldered or spot welded on the ends of the tubes, which have been cut diagonally to facilitate attachment of the conducting wires. The outside surfaces of the tubes are then coated with insulating varnish or the like, which is shown in FIGURE 1 as insulating films 20, 21, 22, and 23, the tubes are flared as shown, if desired, and are fitted within retainer tube 10 and each other as shown in FIGURE 1 to form the sturdy structure shown. The structure thus formed is next potted inside and out in a suitable plastic material. The plastic material is then machined off the outside surfaces of the structure, except for the fillets left over the flanges of the tubes as shown in FIGURE 1, these fillets serving as barriers or guides for the brushes that contact slip rings 15, 16, 17, and 18.

It can be seen that the structure shown is inherently rigid and sturdy, for each tube supports the tubes within it. Furthermore, although the example shown in FIGURE 1 has only four slip rings, structure embodying the invention may be built that have much larger numbers of slip rings while still maintaining the required rigidity; and the structure is sturdy enough so that other devices, such as sector switches, may be placed and successfully operated wherever desired along the slip ring construction.

A further desirable feature of this slip ring construction results from the progressively smaller circumference of the slip rings, from outside tube to inside tube. This decrease in slip ring size lessens the net frictional drag, a highly important factor in some applications.

FIGURE 2

Shown in FIGURE 2 is a slip ring construction 40, of the type described, incorporated into a device having a rotating member 42. Slip ring construction 40 has its retaining tube 10 surrounded and held by sleeve 43, upon which is moutned rotating member 42, so that slip ring construction 40 rotates with rotating member 42. Free rotation is allowed by a ball bearing which has an inner race 44 mounted on sleeve 43 and has an outer race 45 mounted in stationary member 46. Conductors 24, 25, 26, and 27 connect to electric means within rotating member 42, and electric current is conducted through the conductors 24, 25, 26, and 27, axially through the conducting tubes of slip ring construction 40, through the slip rings of construction 40, and through brushes 47 contacting the slip rings of construction 40. The circuits are thus completed from the stationary brushes 47 to the electric means connected to conductors 24, 25, 26, and 27.

Figure 6:
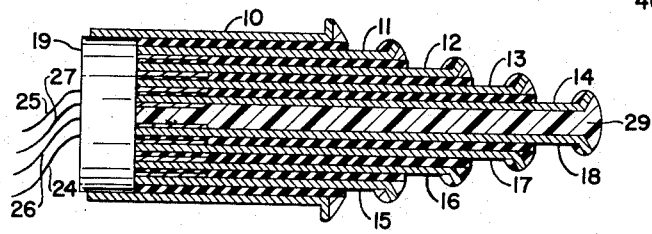
Figure 7:
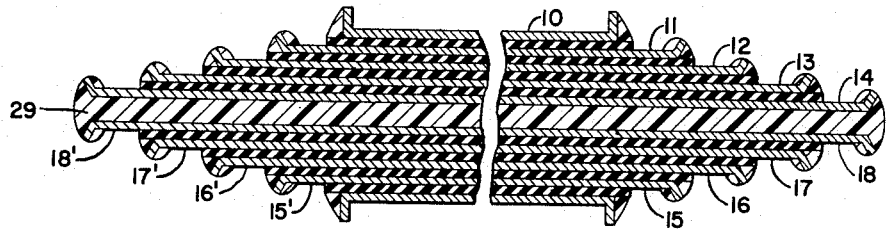

Many variations of the invention are possible. For example, rather than soldering or spot welding conductors to the inner ends of tubes 11, 12, 13, and 14, it may be desirable in some applications to use a plug fitted to be inserted within the structure so as to make electrical contacts with the inner surfaces of the several conducting tubes. This is the embodiment depicted in FIGURE 6. Or, as depicted in FIGURE 7, it may be desirable to construct a device having the tubes so proportioned that slip rings are formed at both ends of the conducting tubes.

Figure 3:
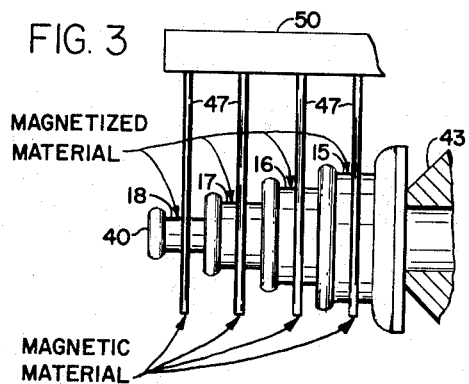
FIGURES 3, 4, 5, 6 and 7 depict alterantive embodiments of the invention.
Figure 4:
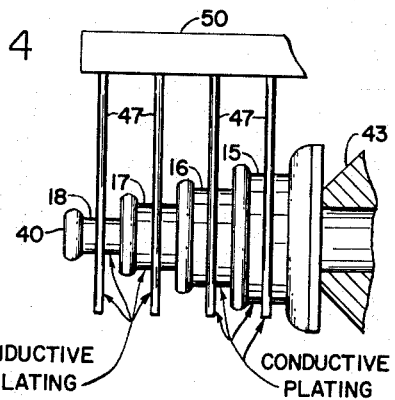
Figure 5:
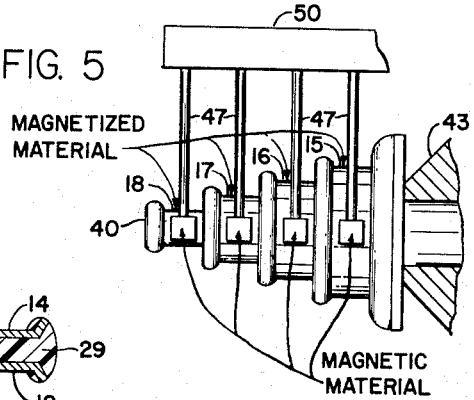

In addition, as shown in FIGURE 3, the concentric tubes 11, 12, 13, and 14 may be made of magnetic material, such as hard steel, are magnetized; the brushes 47, when also made of magnetic material, then are caused by magnetic forces to press against the slip rings with a substantially constant force. The tubes and brushes, as shown in FIGURE 4, can be plated with a good conducting metal, such as silver, to improve current conduction. Or, rather than plated magnetic brushes, nonmagnetic brushes having an additional piece of magnetic material attached may be used. Such an arrangement is shown in FIGURE 5 and also in my copending application, Serial No. 655,268, filed April 26, 1957, now Patent 2,900,471.

Many other changes and modifications of this invention will undoubtedly occur to those who are skilled in the art and I therefore wish it to be understood that I intend to be limited by the scope of the appended claims and not by the specific embodiment of my invention which is disclosed herein for the purpose of illustration.

I claim:

1. An electric slip ring and sliding contact assembly comprising: a plurality of concentrically fitted current conducting tubes, each of said tubes having flange means extending laterally outward at one end thereof and said tubes being axially positioned relative to one another so that said flange means are axially spaced and so as to expose conductive cylindrical surfaces of said tubes near the flanged ends thereof in stepped relation; insulating means maintaining said tubes in spaced and fixed concentric relation to each other; insulating means abutting at least one side of each of said flange means of said tubes, said flange means serving to mechanically strengthen said abutting insulating means; a plurality of conductors individually and securely attached one to each of said tubes at the ends opposite the flanges; and sliding contact means engaging the exposed conductive cylindrical surfaces of said tubes and retained in axial spaced apart relation by said flange means and said abutting insulation means.

2. An electric slip ring and sliding contact assembly comprising: a plurality of concentrically fitted magnetized metal tubes, each of said tubes having a flange means extending laterally outward at one end thereof and said tubes being axially positioned relative to one another so that said flange means are axially spaced and so as to expose conductive cylindrical surfaces of said tubes near the flanged ends thereof in stepped relation; insulating means maintaining said tubes in spaced and fixed concentric relation to each other; insulating means abutting at least one side of each of said flange means of said tubes, said flange means serving to mechanically strengthen said abutting insulating means; a plurality of conductors individually and securely attached one to each of said tubes at the ends opposite the flanges; and sliding contact means comprising magnetic material engaging the exposed conductive cylindrical surfaces of said tubes, said contact means being maintained in contiguity with said surfaces by magnetic forces between said contact means and said magnetized tubes and retained in axial spaced apart relation by said flange means and said abutting insulation means.

References Cited in the file of this patent

UNITED STATES PATENTS

| 1,911,340 | Apple | May 30, 1933 |
| 2,234,982 | Ross | Mar. 18, 1941 |
| 2,414,957 | Larrabure | Jan. 28, 1947 |
| 2,436,949 | Anderson | Mar. 2, 1948 |
| 2,471,808 | Baker | May 31, 1949 |
| 2,473,526 | Hood et al. | June 21, 1949 |
| 2,634,495 | Callsen et al. | Apr. 14, 1953 |
| 2,696,570 | Pandapas | Dec. 7, 1954 |
| 2,764,747 | Modrey | Sept. 25, 1956 |
| 2,788,501 | Buquor et al. | Apr. 9, 1957 |
| 2,790,152 | Mohr | Apr. 23, 1957 |

FOREIGN PATENTS

| 204,706 | Great Britain | Oct. 9, 1924 |
| 314,724 | Germany | Oct. 2, 1919 |

OTHER REFERENCES

Electronics, April 1956, page 271.